Jan. 17, 1961  A. P. DOUGLAS  2,968,493
BRAZED TUBULAR BICYCLE STEERING FORK ASSEMBLY
Filed Feb. 14, 1958  3 Sheets-Sheet 2
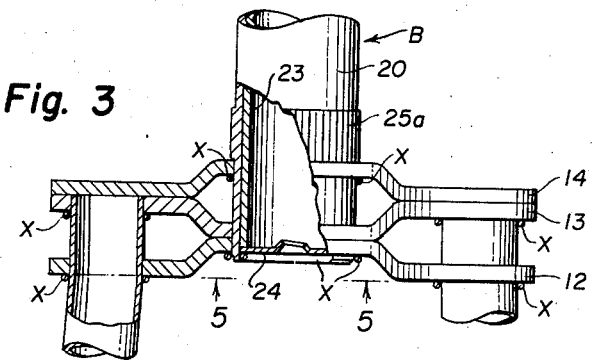
Fig. 3
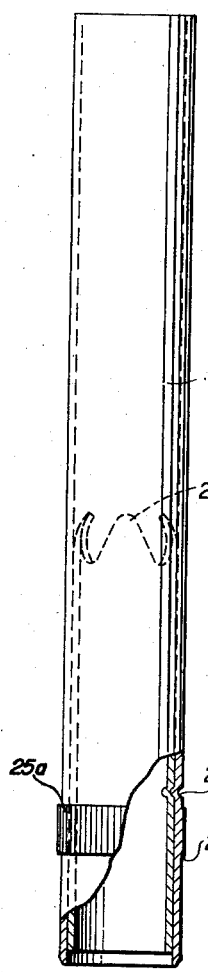
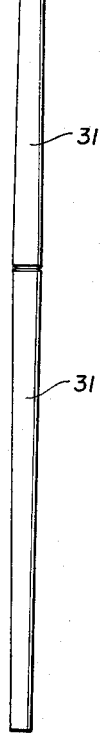
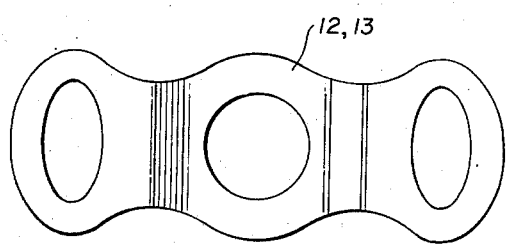
Fig. 4
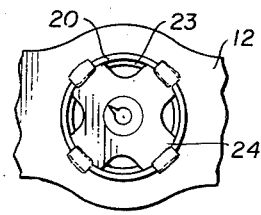
Fig. 5
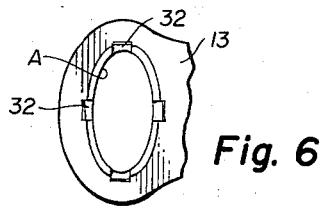
Fig. 6
Fig. 7  Fig. 8
INVENTOR.
ALVIN P. DOUGLAS
BY Golrick & Golrick
ATTORNEYS Jan. 17, 1961  A. P. DOUGLAS  2,968,493
BRAZED TUBULAR BICYCLE STEERING FORK ASSEMBLY
Filed Feb. 14, 1958  3 Sheets-Sheet 3

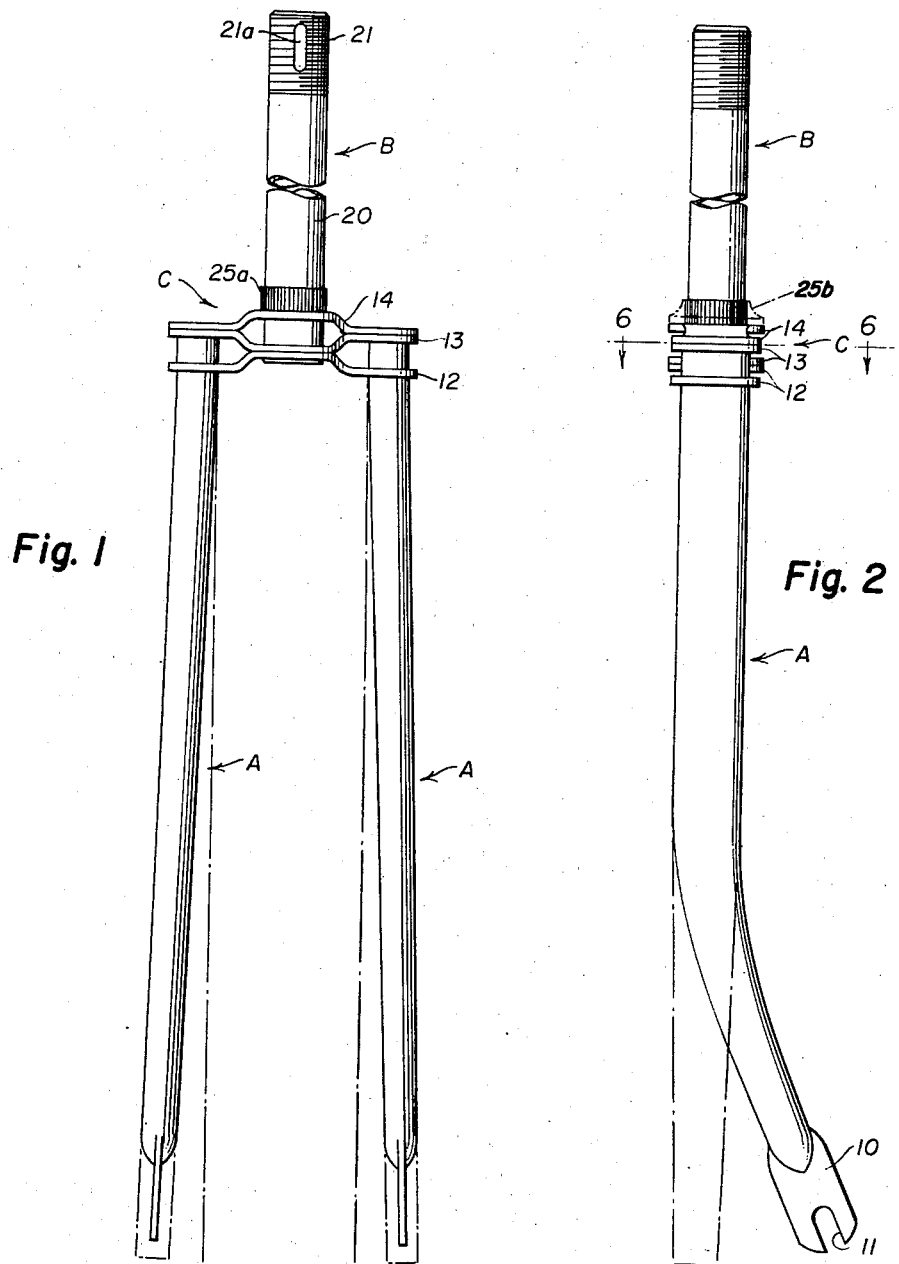

INVENTOR.
ALVIN P. DOUGLAS
BY
ATTORNEYS

United States Patent Office 2,968,493
Patented Jan. 17, 1961

2,968,493

BRAZED TUBULAR BICYCLE STEERING FORK ASSEMBLY

Alvin P. Douglas, Nashville, Tenn., assignor to The Murray Ohio Manufacturing Company, Nashville, Tenn., a corporation of Ohio Filed Feb. 14, 1958, Ser. No. 715,369

6 Claims. (Cl. 280—280)

The present invention is concerned with an improved tubular bicycle steering fork assembly of brazed construction and a method of fabricating the same.

A conventional steering fork form comprises a stem portion to be journaled in a bicycle frame head post either directly as in older structure or through bearing cone members, a pair of generally parallel spaced dependent fork arms with upper ends secured through a crown or yoke to the bottom of the fork stem in one manner or other and having lower ends formed to receive and clamp the axle of a bicycle wheel located therebetween. Various particular bicycle steering fork structures proposed in the prior art generally have been concerned with providing a strong steering fork of good service life which nonetheless may be manufactured at relatively low cost, and correspondingly varied methods have been proposed for fabricating such forks by mass production methods. However some such structures, while per se simple, have not been adapted to simple tooling or simple production operations. Others, though produced by simple basic fabricating operations, have required heavy components to be adapted to the production methods desired militating against the desired light weight of a complete bicycle frame. Other disadvantages of prior fork structures and production methods will be adverted to in the following.

By the present invention there is provided a bicycle steering fork structure comprised of tubular elements and a few plate like connecting elements which are so arranged and brazed together that a light weight yet sturdy fork results.

The fork includes a pair of downwardly tapering forwardly concavely curved roughly parallel tubular arms, the lower ends of which are respectively pressed closed and slotted to accommodate a wheel axle, while the upper ends by brazing are joined to each other and to a stem of tubular form by three generally similarly shaped formed plate elements comprising a shoulder or crown structure. The lower end of the stem is reinforced and provided with a fender attaching formation by insert elements. In general external appearance the finished fork assembly is similar to that disclosed in the brazed forks of prior U.S. Patent 585,043 to Metz or 1,403,257 to Lewis.

A stem sub-assembly is produced by cutting off a blank from cylindrical tubular stock, knurling the same to raise a circumferential band spaced from one end at a locus beginning at about the depth of contemplated insertion of the stem tube into the shoulder or crown plates, inserting a tubular reinforcement into the same end of the stem blank a distance slightly greater than the reinforcement length to form an internal shoulder in the stem blank and staking the blank and insert together. Thereafter the stem blank is chamfered and a light cut taken up to the knurled area to size the end for a light press fit into the central apertures of the aforementioned shoulder plates. A star plate or other suitable element affording a point of fender attachment is placed in the stem blank end against the insert to complete the stem sub-assembly.

Like tubular fork arm blanks are formed with respective ends adapted to a force fit in the lateral openings of the previously described plates, a particular form of which is later described in detail. Such blanks in straight form are press-fitted into a pair of lower plates, the arm blanks being held in exact parallel relation while the plates are allowed to shift into proper alignment required by the parallelism of the arm blanks. At the same time the arm blanks are locally deformed endwise in a manner whereby the plates are retained on the arm ends in proper disposition for brazing.

Thereafter the third or top plate of the shoulder or crown is applied and held in abutting aligned relation to the top or outermost plate already assembled to the arms, and the previously described stem sub-assembly is press-fitted through the aligned central apertures of the shoulder plates to bring the stem shoulder to bear on the third plate while the inserted stem end projects slightly beyond the bottom-most plate surface. In the same press-fitting set-up the projecting stem end is deformed or staked to secure the bottom-most shoulder plate thereon, and also to retain the star plate insert, with the several areas of contact among the components now also retained in proper position for the subsequent brazing operation. In the last press fitting operation the arms are supported in parallel relation.

It will be noted that the arm blanks are of axially straight form thus far in the operations of fabrication and that the plates into which they are forced are permitted to shift relatively in rotational sense as required to accommodate the enforced parallel disposition of the arm blanks. Only simply applied, axially directed press-fitting forces are required, without the difficulty of holding in proper orientation for force-fitting, and without the difficulty of applying the necessary force to, fork arms that are preformed to have required curvature along the length thereof and to have mutual lateral divergence where required.

The assembly is thereafter brazed; preferably since the assembly of this invention at this stage is so adapted, at all joints simultaneously by applying brazing material, pure copper for example, in the necessary locations and passing through a hydrogen brazing furnace. The resulting brazed joints are not only continuous over the areas of component contact giving a strong integral structure, but also the external joint areas are smooth requiring no grinding or abrading operations or use of added concealing components to eliminate unsightly areas such as result from flash or splatter in welded and some brazed joints. It may be noted that the furnace brazing operation also serves to relieve stresses in the assembly.

In further operations on the now rigid brazed assembly, the arms are formed to the desired curvature, lateral divergency and closed, slotted and trimmed bottom ends for axle accommodation; the stem is machined by turning to form a cone seat, chamfering the upper end and reaming the interior as required and threading the upper end. Thereafter the fork may be heat treated and annealed as required.

In the foregoing, the fork structure is outlined in terms of components for a single fork. It should be obvious, however, that for mass production operations clear advantages are present in producing the sub-assemblies going into the final assembly; in the adaptability of the assembly to a single brazing operation; in avoiding distinct right and left hand forms of components while in unassembled state; and in facility of set-up operations for the final assembly operations.

An object of the present invention, insofar as fork structure is concerned, is that a strong light weight fork be provided. A further object is the provision of a fork structure which is adaptable to low cost mass production methods both in manufacture of individual components and in assembly of the same.

Other objects and advantages will appear from the following description and the drawings wherein:

Fig. 1 is a front elevational view of a bicycle steering fork assembly embodying the structure of and produced by the method of the present invention;

Fig. 2 is a side elevation corresponding to Fig. 1;

Fig. 3 is a fragmentary enlarged view of the crown or shoulder structure whereby the stem and fork arms are joined together with certain portions broken away;

Fig. 4 is a detail view showing in plan the form of certain components of the crown structure;

Fig. 5 is a detail fragmentary view taken along the line 5—5 in Fig. 3;

Fig. 6 is a fragmentary view taken along the lines 6—6 in Fig. 2;

Fig. 7 is a detail, partially in section, of certain parts of the stem;

Fig. 8 represents more or less in outline form the derivation of two axially straight but tapered tubular blanks for the fork arms.

Figure 9:
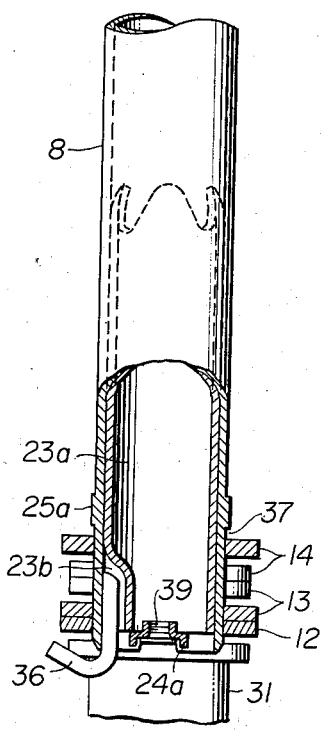
Figs. 9 and 10 show a modified form of the fork construction.

This application is a continuation-in-part of my prior application Serial No. 652,547, filed April 12, 1957.

In the drawings Figs. 1 and 2 there is shown, in front and side elevation respectively, a tubular steering fork assembly for the front wheel of a bicycle, having a gross form and structure known in the art comprising a pair of laterally spaced right and left arms A, parallel in lateral aspect and dependent from respective end portions of a head or transverse crown assembly or shoulder C secured to the lower end of the vertical stem or bearing tube assembly B.

The two arms A on left and right are identical tubular members symmetrically disposed, as is the entire fork assembly, about a longitudinal vertical mid-plane through the axis of the stem B, the arms being slightly downwardly divergent. As may be seen from Figs. 1, 2 and 6 each tubular member A is oval in cross-section, generally uniform and straight in about the top third and thereafter tapering toward the bottom end 10 and also having the bottom half curved concavely forwardly, with the bottom end flattened together and slotted endwise at 11 for reception of a front wheel axle.

The crown assembly C includes a lower plate 12, a middle plate 13 and a top plate 14, which are identical in external shape and in location of a large central aperture for receiving the lower end of the stem B, the top plate however differing inasmuch as it lacks the oval apertures in its flat end portions, which—as shown in Fig. 4—are provided in the identical plates 12, 13 for receiving the upper ends of arms A. As may be clearly seen in Fig. 1, the central area of each plate is offset from but parallel to the co-planar end portions thereof, so that with the central offsets of plates 12 and 13 brazed in face-to-face relation, the corresponding apertured end portions are vertically spaced for a more stable and strong brazed connection with the top ends of the arms; and also the stem B, just inward of the lower end, is brazed and supported over two plate thicknesses. With the end portions of plates 13 and 14 brazed in face-to-face relation not only is a cap or closure provided brazed to and across the top of each arm member A, but also the central offset of plate 14 is brazed to stem B at a locus spaced upward from the middle plate 13 again to provide a strong stable connection of crown C to stem B.

The stem assembly B includes a cylindrical tube 20 with upper end 21 threaded and longitudinally slotted or grooved at 21a to form a key-way or the like formation; a generally cylindrical reinforcing insert 23 and a "star plate" 24 received in the lower end of 20 to rest against the internal shoulder formed by the end of tube 23. The star plate is centrally apertured to receive a front fender mounting screw. The tube 20, insert 21 and plate 24 are brazed together at their areas of contact.

The overall structure of the finished fork has thus far been described in general terms; hereinafter as the method for fabrication is described other particular points of structure will be considered.

In producing the plates 12, 13, 14 in the trussed type beam structure of the crown C, identical blanks are blanked out of say 11 gauge steel sheet or strip stock and formed to have the central area offset as the flat bottom of a shallow sloping walled trough, by the same blanking die or identical dies, resulting in semi-complete plates with identical external form. Next by a piercing operation to form round center and oval end apertures (with major axes parallel) on such a blank, final identical plates (of the configuration appearing in plan in Fig. 4 and in elevation in Figs. 1, 2 and 3) are produced for use as the lower and middle plates 12, 13; and with other such blanks by piercing only a like round central aperture, the top plates 14 result. The centers of the central and elliptical apertures are collinear. If desired a slight upward boss may be formed on the end flat areas of a blank (at the time of piercing for a plate 14) at locations which will ultimately be opposite the openings of the tubular arms and may be useful in locating other parts of a finished bicycle, for example a fixed cone structure of the fork.

For the stem assembly B, a length cut from cylindrical tubular steel stock of desired gauge, e.g. 16 gauge, is knurled over a localized band 25a spaced inward from one end at a distance corresponding to the depth of insertion of the stem B into the shoulder or crown assembly C; the tubular reinforcing element 23 is inserted to such distance that its outer end forms a shoulder at a depth somewhat greater than the thickness of the star plate element 24, and the elements 20, 23 are staked together as at 26.

Thereafter a light machine cut is taken between the knurled area and adjacent end to size the end of the stem to a diameter for a light press-fit into the three circular central openings of the plates 12, 13, 14 as hereinafter explained; and also to establish a definite shoulder 27 at the edge of the knurl exactly spaced from the adjacent end of the stem. The corresponding end of the stem assembly is chamfered either at the time the sizing cut is made, in the initial cut-off of the blank for 20, or at other apt time. By omission of the chamfer on the upper end of the stem, Fig. 7 would represent the stem sub-assembly thus far completed. The star plate 24 is then inserted in the end of 20 to complete a stem sub-assembly.

The blanks for the arms A preferably are produced by cutting off double lengths of cylindrical tubular stock, swaging the same to an oval or elliptical cross-section which tapers symmetrically from a straight central portion toward both ends of each piece, and then cutting each swaged double length in half to result in a pair of like blanks, preferably forming a chamfer on each at the cut-off point, as indicated by the parts 31 in Fig. 8.

The central portion of the swaged double length has a size and shape corresponding to the like oval apertures of the plates 12, 13 for a force fit therein as later described.

The flat star plate 24 is produced with a central aperture of desired form by any desired method.

The large chamfered ends of a pair of arm blanks 31 are forced into the aligned oval apertures of plates 12, 13 with offset center portions in back-to-back relation in a suitable hydraulic press applying longitudinal force to the arm blanks while maintaining the same in parallel relation. Suitable press tooling is provided including pilot fingers for the entering ends of the blanks; supporting spacer blocks entering into the space between the slope and parallel end portions of the plates 12, 13 and the intended location of the arm ends; and also a back-up pad for plate 13 having means therein for staking or deforming the chamfered end area of each tubular arm blank outwardly into contact with the surrounding wall of the oval aperture in plate 13, at say two or four spots 32, as indicated in Fig. 6.

This deformation to overcome locally the arm end chamfers may be done, for example, either by fixed projections on the back-up pad for deformation simultaneously with the press-fit, or by small elements moved through the back-up pad sequentially after the arm ends have been forced to full depth flush with the top surface of plate 13. By such deformation not only are the ends of the plate 13 secured against any tendency to spring off the arm ends upon release of press-applied force, but also suitable contact of the surfaces to be brazed in subsequent operations is assured. The support of plates 12 and 13 during such force fitting operation is however to be such that the plates 12, 13 can shift into final alignment demanded by the maintained parallel and fixed relation of the arm blanks.

In the same hydraulic press, where shiftable tooling for back-up of the shoulder structure elements is used, or in a separate press, the plate 14 is aligned and held with end flats against the corresponding flats of plate 13 in the partially assembled fork resulting from the first press-fitting operation. With suitable supporting spacer blocks inserted between the off-set center portions of plates 13, 14, preferably with suitable supports bearing on the outer end flats of the plate 14, and with a back-up pad of suitable form for the central part of lower plate 12 in place, the chamfered end of the previously described stem sub-assembly is forced for a light press-fit by longitudinally applied force of the press in one stroke successively through the central apertures of plates 14, 13, 12 to protrude a short distance through plate 12 as appears in Fig. 3, the stem shoulder 27 coming to bear against plate 14. The stem is of course suitably supported to direct it at right angles through the plates.

Here again staking or localized deformation of the protruding chamfered stem end may be effected at the terminal period of the press-fitting stroke of the stem by suitable staking elements on the pad or back-up block for plate 12. With the star plate 24 located in proper position before the press-fitting stroke, such staking will serve to secure plate 12 on the end of the stem and to retain the star plate pressed against the end of insert 23; and ultimately will ensure good brazing contact of the surfaces. The shoulder 27 on the stem and the end securement of the stem also will ensure excellent brazing contact of plates 14 with plate 13 and with the stem. For this second press operation, plates 12, 13, 14 are securely held in alignment, and preferably arm blanks 31 are held in proper relative position, so that no stresses are developed to displace the arm blanks cut of parallelism after removal from the press.

Next suitable brazing material is applied to the several joints of the assembled frame elements. Thus with 1010 or 1020 steel in the several components, and use of a hydrogen brazing furnace contemplated, pure copper may be applied in wire form at the several locations indicated at "X" in Fig. 3. With the fork inverted into stem down position, a piece of copper may be dropped down each arm, and the copper will not only spread between the abutting flat faces of plates 13—14, but also will creep up the outer surface of each arm end portion to the joint at plate 13, in consequence of score marks formed in the forced fit passage of the arm blank through the aperture of plate 12.

The pair of long dashed lines in Fig. 1 indicate the general position of the inner sides of the arms throughout the assembly operations and immediately after brazing is completed, and the other dashed line extensions of the arms in Fig. 1 and the dashed lines in Fig. 2, the corresponding arm shapes.

After the brazing operation is completed (say at about 2000° F. for pure copper as the brazing material), and the brazed fork assembly is cooled, the straight arms are bent into curved form, flattened together and notched at the free ends, and spread if desired to attain the final form appearing by solid lines in Figs. 1 and 2.

After forming of the arms, the upper flat of the centrical offset of plate 14 and the adjacent circumference of the stem at 25a over the previously knurled area are finished cut in a final cone seat turning operation for accommodation of a fork stem bearing cone as at 25b. When the cone seat is completed the upper end of the stem is reamed as required for handle bar clamping parts to be accommodated, and then chamfered. The upper end is then threaded at 21, and a suitable keyway or slot formed as at 21a.

The fork resulting in consequence of the structure herein described has the brazing material, the copper, capillarily distributed at the joining regions in the sense that the copper is present not only as a thin bonding layer between facing or abutting surfaces, but also at angularly disposed surfaces adjacent a joint between components the copper presents a smooth small fillet, which to the eye is meniscus-like in the manner of merging smoothly into the adjacent surface of the components. Hence there is no need to remove material from the area of the joints, or to conceal the same by additional components in order to present an acceptable appearance of the fork.

Figure 10:
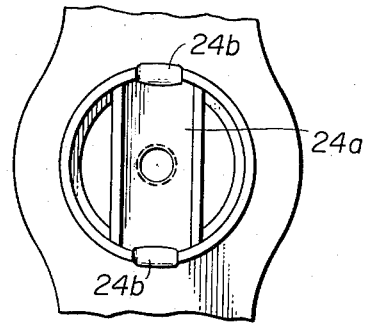

In Figs. 9 and 10 is shown a modified form of the fork structure, the general construction of all of the parts being as hereinbefore described with the exception of the reinforcing tube 23 and the star plate 24. As shown in Fig. 9 the inner tube 23a is provided with a pocket formation 23b at its lower end to receive a pure copper billet 36 when the assembly of all the parts is completed and positioned in the furnace for the brazing of all the joints. This copper slug or billet is formed of copper wire and shaped to overhang the end of the tube 8. The overhanging portion of the copper slug melts down and flows around and between the joints of the fork plates 12 and 13 while the inner part of the copper slug melts down in the pocket 35 and flows between the inner face of tube stem 8 and the contacting face of the reinforcing tube 23a with the internal surface of the stem 8.

The upper bridge or plate member 14 is press fitted in spaced relation to the knurl formation about one-sixteenth of an inch as shown at 37 to assure proper support of the bearing cone when the same is lightly press fitted on the raised or knurled portion 25a of the tube 8 and down upon the top face of the plate member 14.

I have found that in heat treating and hardening of the stem structure the use of the star washer presented some difficulties as the cyanide salt rinsing consumed undue time due to the star washer interfering somewhat with rapid rinsing. By using a member 24a in the form of a channel shape which can be clinched or staked in place at 24b after the hardening operation and rinsing a time advantage is obtained, the nibs 24b being upset to secure the channel member 24a to the bottom end of the inner reinforcing tube 23a. An opening 39 for reception of a fender securing screw may be tapped or a self-tapping screw may be used.

I claim:

1. In a bicycle steering fork, the improvement comprising: a crown including three elongated superposed plates having identical external form and identical round central apertures for receiving the lower end of a stem, each plate having the centrally apertured middle portion offset through sloping connecting portions from coplanar end portions, a lower pair of said plates being disposed with the end portions vertically spaced and middle portions abutting flatwise, the end portions in said pair having apertures identically shaped and located in alignment for receiving the upper ends of a pair of fork arms, and a third of said plates being disposed on the uppermost of said lower pair of plates in aligned relation with the end portions of the uppermost and third plate abutting flatwise and with the middle portions thereof spaced; a pair of tubular fork arms with upper ends press-fitted respectively into the aligned apertures in the end portions of the lower pair of said plates and abutting endwise against the third plate, said arms being symmetrically disposed and spaced on opposite sides of a vertical plane bisecting the crown; a cylindrically tubular stem having a lower end reduced to form a shoulder and press-fitted into the aligned central apertures of said plates to project slightly beyond the lowermost of said plates and with said shoulder abutting against the third plate; said stem at the lower end being provided with a tubular internal reinforcing element of substantially uniform wall thickness fitted slightly beyond its full length therein to form an internal shoulder; and capillarily distributed brazing material joining the abutting portions of said plates to each other, and the tubular stem and arms to the plates in the respective regions of press-fitted insertion and abutment.

2. A fork as described in claim 1 wherein a localized enlarged diameter on the stem provides said shoulder and also forms a seat for a fork bearing cone.

3. A fork as described in claim 1 having as the brazing material copper metal pure in a brazing sense.

4. In bicycle steering fork, the improvement comprising: a crown including three elongated superposed plates having identical external form and identical round central apertures for receiving the lower end of a stem, each plate having the centrally apertured middle portion offset through sloping connecting portions from coplanar end portions, a lower pair of said plates being disposed with the end portions vertically spaced and middle portions abutting flatwise, the end portions in said pair having apertures identically shaped and located in alignment for receiving the upper ends of a pair of fork arms, and a third of said plates being disposed on the uppermost of said lower pair of plates in aligned relation with the end portions of the uppermost and third plate abutting flatwise and with the middle portions thereof spaced; a pair of tubular fork arms with upper ends press-fitted respectively into the aligned apertures in the end portions of the lower pair of said plates and abutting endwise against the third plate, said arms being symmetrically disposed and spaced on opposite sides of a vertical plane bisecting the crown; a cylindrically tubular stem having a lower end reduced to form a shoulder and press-fitted into the aligned central apertures of said plates to project slightly beyond the lowermost of said plates and with said shoulder abutting against the third plate; said stem at the lower end being provided with a tubular internal reinforcing element of substantially uniform wall thickness fitted slightly beyond its full length therein to form an internal shoulder and also being provided with a fender anchoring plate inserted in said lower end to abut against said shoulder; and capillarily distributed brazing material joining the abutting portions of said plates to each other, and the tubular stem and arms to the plates in the respective regions of press-fitted insertion and abutment.

5. A bicycle steering as described in claim 4 wherein said element has an endwise open indented formation at the lower end portion thereof adjacent the plate connections with the stem for the reception and distribtuion of brazing material interiorly to the interior surface of the stem and to the exterior surface of the stem where the stem is press-fitted to the plates.

6. A fork as described in claim 4 having a localized increased diameter on the stem forming the shoulder abutting the said third plate, the increased diameter of the stem and the top face of the third plate forming bearing cone seats for a stem bearing cone fitted on the localized enlargement of the stem.

References Cited in the file of this patent

UNITED STATES PATENTS

| | | |
|---|---|---|
| 585,043 | Metz | June 22, 1897 |
| 1,403,257 | Lewis | Jan. 10, 1922 |
| 2,144,332 | Glaser | Jan. 17, 1939 |
| 2,491,379 | Kraeft et al. | Dec. 13, 1949 |
| 2,561,710 | Pawsat | July 24, 1951 |

FOREIGN PATENTS

| | | |
|---|---|---|
| 10,088 | Great Britain | of 1895 |